Oct. 7, 1941. G. A. TINNERMAN 2,258,342

FASTENING DEVICE

Original Filed July 31, 1936

INVENTOR.
GEORGE A. TINNERMAN
BY Bates, Goldrick, & Teare
ATTORNEYS

Patented Oct. 7, 1941

2,258,342

UNITED STATES PATENT OFFICE 2,258,342

FASTENING DEVICE

George A. Tinnerman, Rocky River, Ohio, assignor, by mesne assignments, to Tinnerman Products, Inc., Cleveland, Ohio, a corporation of Ohio Original application July 31, 1936, Serial No. 93,679, now Patent No. 2,159,573, dated May 23, 1939. Divided and this application October 15, 1938, Serial No. 235,275

1 Claim. (Cl. 85—32)

This invention relates to fastening devices and particularly to a device for holding a nut firmly in position for receiving a threaded bolt. There are many instances, especially in blind locations where a standard nut is desired, but where the operator either cannot hold it in place while the bolt is being inserted, or cannot thereafter hold it against rotation during the final tightening operation. The present application is a division of my copending application, Serial No. 93,679, filed July 31, 1936, and since issued as U. S. Patent Number 2,159,573, May 23, 1939.

An effort has been made to retain a nut in bolt receiving position by welding it to one of the parts, but such method is not only expensive, but is objectionable in that the nut cannot be moved a slight distance to compensate for misalignment of the openings in the two parts that are to be connected together.

An object of the present invention is to make a fastener which can be readily attached to one of the parts to be joined and which will be so formed that it will hold the nut firmly in bolt receiving position. The attachment may take any one of several different forms but in each case it comprises a clip which is frictionally held by spring tension onto one of the parts, and in each case, has provision thereon for holding a nut against rotation.

Figure 1:
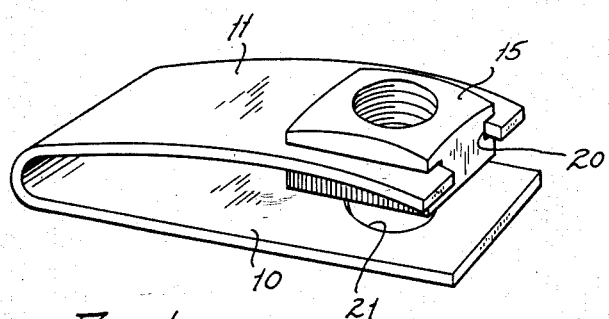
Figure 2:
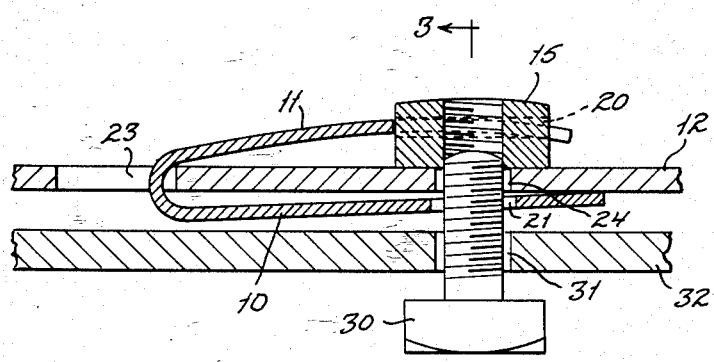
Figure 3:
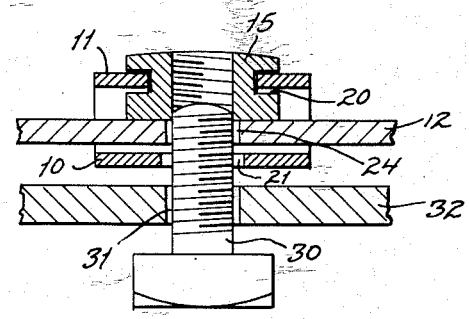

In the drawing, Fig. 1 is a perspective view of a fastener embodying my invention; Fig. 2 is a section taken through the fastener and showing it in work engaging position, and Fig. 3 is a section taken on the line 3—3 in Fig. 2.

The fastener illustrated comprises a clip that is formed from a sheet metal strip that is bent upon itself to make a lower arm 10 and an upper arm 11, the two arms being spaced apart a sufficient distance to admit one of the parts to be joined that is indicated for example at 12. The arms of the clip may be spread apart slightly to admit the article, wherefore the normal tendency of the arms to approach each other will hold the fastener by inherent tension upon the article. One of the arms, preferably the upper one, has provision for receiving and holding a standard nut indicated at 15. In this form, the arm has a nut receiving opening illustrated for example as a slot into which the nut may be inserted. One form of holding the nut in the slot embodies grooves 20 which fit snugly against the walls of the opening whereby the nut is held in bolt receiving position. In the preferred arrangement, the arm 10 has a bolt receiving opening 21 in alignment with the opening in the nut.

When the fastener is used, the part to which it is applied may have an opening 23 through which the arm 11 and the associated nut 15 may be passed and may have another opening 24 spaced therefrom through which the bolt 30 may be passed. In this way, the fastener may be applied to an article which is accessible only from the front side, and yet, the nut may be held firmly in bolt receiving position. The part 32 to which the part 12 is adapted to be attached is provided with a bolt receiving opening 31 in registration with the corresponding openings in the fastener.

The fastener made in accordance with the present invention can be economically made and will operate in a satisfactory manner to position a standard nut in place to receive a threaded bolt. The fastener functions not only to hold the nut in bolt receiving position but also to retain it against rotation during the tightening operation.

I claim:

A unitary nut and nut holding device comprising a nut having generally horizontal grooves on opposed sides thereof and a nut holder comprising a strip of sheet metal bent to provide a pair of arms extending in the same general direction for receiving therebetween an apertured part to be secured, one of said arms of the nut holder being provided with a slot having an open end receiving the nut and defining a pair of spaced holding elements having generally curved plane surfaces, said nut being applied to the open end of said slot with said holding elements received in said grooves thereon and the generally curved plane surfaces of said holding elements in resilient engagement with the adjacent walls of said grooves for frictionally retaining the nut in assembled relation with the nut holder.

GEORGE A. TINNERMAN.